Jan. 3, 1928.  1,654,540
A. F. FILES
DISPENSING MACHINE
Filed March 3, 1927
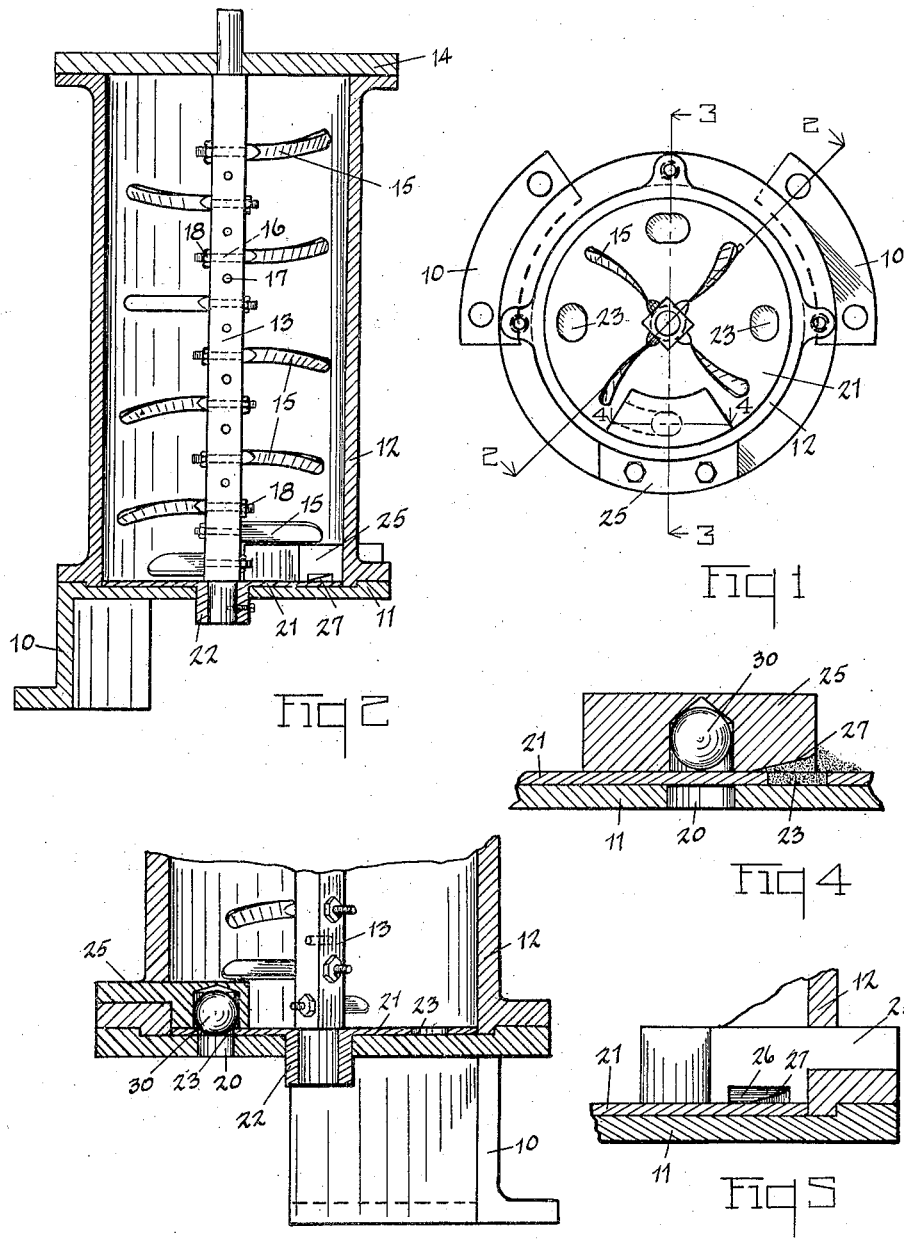
Inventor
Adino F. Files.
By Faust F. Crampton
Attorney Patented Jan. 3, 1928.

1,654,540

UNITED STATES PATENT OFFICE.

ADINO F. FILES, OF MAUMEE, OHIO.

DISPENSING MACHINE.

Application filed March 3, 1927. Serial No. 172,254.

My invention has for its object to provide a dispensing machine for materials of different kinds and having different physical characteristics, as to plasticity and adherence of particles, that control or modify its delivery in subdivided portions in substantially uniform configurations or shapes. The machine, preferably, forms small masses of the material that will be uniform in shape and uniform in quantity and confined within small areas or volumes. The dispensing machine embodying my invention may also be provided with means for regulating the flow or movement of the material to the delivering means and so that the movement of the material may be controlled, notwithstanding slight variation in the adherability or compactiveness of the material dispensed. As is well known in connection with certain amorphous and finely divided materials there will be a marked difference in their compactiveness by a very slight change in moisture such as the change in the humidity of the atmosphere, or by a very slight change, though inappreciable change, in the proportions of the ingredients of the material. This is particularly noticeable where a liquid or an oleaginous material constitutes a part of the ingredients of the material.

The invention may be contained in structures of different forms and to illustrate a practical application of the invention, I have selected a structure embodying the invention as an example of structure containing the invention, and shall describe it hereinafter. The structure selected is shown in the accompanying drawing.

Fig. 1 illustrates a top view of the dispensing machine, one of the parts being shown removed in order to illustrate the interior of the hopper forming a part of the dispensing machine. Fig. 2 illustrates a view of a section taken on the plane of the line 2—2 indicated in Fig. 1. Fig. 3 is a broken view of a section taken on the plane of the line 3—3 indicated in Fig. 1. Fig. 4 is a view of a section taken on the plane of the line 4—4 indicated in Fig. 1, and Fig. 5 is a view of the end of a compacting block.

In the particular form of construction shown in the drawing, the dispensing machine is provided with a bracket 10 that may be secured to the bed of a machine, the machine having means for driving the dispensing machine and driving suitable conveyors and other parts that may be used for performing desired functions in connection with the dispensing of the material, such as, wrapping, packing, etc. The bracket 10 may be provided with a plate 11 that forms the bottom of a hopper or cylinder 12 into which the material to be dispensed may be placed. A spindle 13 is located in the hopper 12 and is rotatably supported in a bar 14, that may be secured to the upper edge of the hopper 12, and also in the plate 11 that forms the bottom of the hopper. The spindle 13 is provided with a plurality of blades 15 that are, preferably, curved and are adjustably secured to the spindle 13. Each blade 15 is, preferably, provided with a threaded shank 16 that may be inserted through openings 17 formed in the spindle 13, and the blades 15 are secured in position by means of the nuts 18 that are threaded onto the ends of the shank 16 so as to clamp the spindle 13. The curvature of the blades 15 are such that they will occupy different positions with reference to the horizontal if they are turned so as to turn the shank within the spindle whereby one or more of the blades may be turned so as to hold the material from moving downward, that is, so that they will tend to raise the material when the spindle is rotated, or merely agitate the material, the blades operating merely to move through the material, or they may be positioned so that they will cooperate with the weight of the material and work it downward, thus the blades may be adjusted so as to subject the material to the desired pressures in the different parts of the container. In the ordinary operation of the spindle and the blades, the material may be held from being compacted in the upper third of the interior of the container, and if desired quite more closely compacted in the lower third while in the bottom it may be, if desired, more firmly compacted, while at the same time the material may be controlled so as to cause it to constantly work downward towards the bottom of the material and vary it as to looseness or compactness as it approaches the delivery point of the material.

Th material is delivered from the bottom of the hopper through an opening 20 that is formed in the plate 11. A disc 21 may be provided with a hub 22 in which the lower end or bearing part of the spindle 13 is located. The hub 22 protrudes through the plate 11 and if desired may be rotated independently of the spindle 13, or may be keyed to the spindle 13 and so as to rotate therewith. The disc 21 may be provided with one or more openings 23 which are so disposed as to register consecutively with the opening 20 as the disc is rotated. The shape of the openings 23 may be varied according to the shape of the cake or configuration of the more or less compacted material that it is desired to form upon delivery. Also, the thickness of the disc may be varied in order to likewise change the vertical dimension of the molded form that is delivered.

As the material is worked down, and, particularly, that portion of the material in proximity to the bottom of the container which has, by the operation or control of the blades, reached the desired degree of compactness or concentration, and has filled the openings 23 of the disc 21, the portions within the openings are carried beneath the housing 25, located in the bottom of the hopper 12, and over the opening 20 of the plate 11. The housing 25 prevents the direct movement of the material from the container through the opening 20 except as the material is conveyed to the opening by the disc 21.

The movement of the disc beneath the housing 25, which is located close to the upper surface of the disc, causes the body of the material to be scraped from the portion of the top of the disc that passes beneath the housing and thus the disc carries the material, more or less, compacted and shaped to the form existing between the planes of the upper and lower surfaces of the disc and the contour of the edges of the openings 23. If the compaction or the adherability of the material with the edges of the disc are not too great, it will pass through the opening 20 as the openings 23 register with the opening 20. It is preferable, however, to so manipulate the material that it will be compacted to some degree within the openings 23 in order that it may be delivered in a definite form or shape to an object that may be located beneath the hopper and in position to receive the material and in such condition that it will scatter when it is dropped from the bottom of the hopper. Thus, if desired, the compaction produced by the blades located in the bottom of the hopper may be adjusted so as to produce the desired pressure of the material on the surface of the disc 21; or, if desired, the housing 25 may be provided with an inclined surface 26 located on the upper side of a recess 27 and formed arcuate and extending from the leading side of the housing 25, with respect to the movement of the disc 21, to the opening 20 of the plate 11.

The sloping surface 26 that forms the upper surface with respect to the recess 27, is located above the path of movement of the openings 23 of the disc and is inclined downward as the opening 20 is approached. The width of the recess 27 and of the sloping surface 26 is substantially the same as the radial dimension of the openings 23 in the disc 21, and, consequently, the sloping surface 26 operates to scrape and gather the material and compact it in the openings 23 and when so compacted the material may be delivered through the opening 20.

In order that the material more or less compacted, and, consequently, having more or less adherence to the edges of the openings 23, may be delivered through the opening 20, a ball 30, preferably a steel ball, is located in the housing 25 at a point directly over the opening 20 and having dimensions such that only very small portions of it will, by reason of its spherical convex surface, enter the openings 23 and dislodge the formed or molded material by its short movements into the openings 23. This will occur when the openings 23 pass over the opening 20. The material will thus be delivered from the machine in a definite molded form and scattering of the portions will be avoided.

I claim:

1. In a dispensing machine for dispensing separated quantities of a substance, a container for containing the material to be dispensed and having an outlet for the material, a rotatable disc having an opening, the said disc operating to open and close the outlet of the container, means for compacting the material in the opening of the disc, a member for covering a portion of the disc and the outlet of the container, and a member rotatably supported on the surface of the disc for displacing the material from the opening of the disc.

2. In a dispensing machine for dispensing separated quantities of a substance, a container for containing the material to be dispensed and having an outlet for the material, a rotatable disc having an opening, the said disc operating to open and close the outlet of the container, means for compacting the material in the opening of the disc, a member for covering a portion of the disc and the outlet of the container, and a ball rotatable over the surface of the disc and confined in its rotation by the member for displacing the material from the opening in the disc.

3. In a dispensing machine for dispensing separated quantities of a substance, a container for containing the material to be dispensed and having an outlet for the material, a rotatable disc having an opening, the said disc operating to open and close the outlet of the container, means for compacting the material in the opening of the disc, a member for covering a portion of the disc and the outlet of the container, and a member rotatably supported on the surface of the disc and located above the opening of the container and confined in its rotatable movements by the covering member, the rotatable member operating to displace the material from the opening of the disc when the opening of the disc passes over the outlet of the container.

In witness whereof I have hereunto signed my name to this specification.

ADINO F. FILES.